United States Patent
Yoshimura et al.

(10) Patent No.: US 7,995,761 B2
(45) Date of Patent: Aug. 9, 2011

(54) DATA PROVIDING SYSTEM, DATA RECEIVING SYSTEM, COMPUTER-READABLE RECORDING MEDIUM STORING DATA PROVIDING PROGRAM, AND COMPUTER-READABLE RECORDING MEDIUM STORING DATA RECEIVING PROGRAM

(75) Inventors: Sachiko Yoshimura, Osaka (JP); Takanao Kawai, Osaka (JP)

(73) Assignee: Kyocera Mita Corporation (JP)

( * ) Notice: Subject to any disclaimer, the term of this patent is extended or adjusted under 35 U.S.C. 154(b) by 845 days.

(21) Appl. No.: 11/972,093

(22) Filed: Jan. 10, 2008

(65) Prior Publication Data
US 2008/0170696 A1    Jul. 17, 2008

(30) Foreign Application Priority Data
Jan. 16, 2007 (JP) .................. 2007-007282

(51) Int. Cl.
*H04L 9/00* (2006.01)

(52) U.S. Cl. ........ 380/277; 380/278; 380/279; 380/280; 380/281; 380/282; 380/283; 380/284; 380/285; 380/228; 380/229

(58) Field of Classification Search .......... 380/277–285, 380/228–229
See application file for complete search history.

(56) References Cited

U.S. PATENT DOCUMENTS

| | | | |
|---|---|---|---|
| 5,956,408 A | 9/1999 | Arnold | |
| 6,914,985 B1 * | 7/2005 | Shrader et al. | 380/30 |
| 7,039,192 B1 * | 5/2006 | Whelan | 380/281 |
| 7,181,017 B1 * | 2/2007 | Nagel et al. | 380/282 |
| 7,340,602 B2 * | 3/2008 | Serret-Avila | 713/161 |
| 7,362,868 B2 * | 4/2008 | Madoukh et al. | 380/277 |
| 7,634,091 B2 * | 12/2009 | Zhou et al. | 380/277 |
| 7,711,122 B2 * | 5/2010 | Allen et al. | 380/286 |
| 7,760,904 B2 * | 7/2010 | Kuzmich et al. | 382/100 |
| 7,783,044 B2 * | 8/2010 | Moreh et al. | 380/278 |
| 2004/0054906 A1 | 3/2004 | Carro | |
| 2004/0153653 A1 * | 8/2004 | Abhyankar et al. | 713/179 |
| 2005/0223239 A1 | 10/2005 | Dotan | |

FOREIGN PATENT DOCUMENTS

JP    2004-54791    2/2004

* cited by examiner

*Primary Examiner* — Krisna Lim
(74) *Attorney, Agent, or Firm* — Gerald E. Hespos; Michael J. Porco

(57) ABSTRACT

A data providing system is provided which includes: a storage section which stores an encoded file obtained by encoding a data file to be distributed with a predetermined common key and an encoded information file obtained by encoding an information data file including information on the common key with a private key different from the common key; and a file transfer section which transfers the encoded file and the encoded information file from the storage section to external electronic device.

10 Claims, 4 Drawing Sheets

DATA PROVIDING SYSTEM, DATA RECEIVING SYSTEM, COMPUTER-READABLE RECORDING MEDIUM STORING DATA PROVIDING PROGRAM, AND COMPUTER-READABLE RECORDING MEDIUM STORING DATA RECEIVING PROGRAM

BACKGROUND OF THE INVENTION

1. Field of the Invention

The present invention relates to a data providing system and a computer-readable recording medium storing data providing program for providing electronic data. In addition, the present invention relates to a data receiving system and a computer-readable recording medium storing data receiving program for receiving electronic data.

2. Description of the Related Art

In recent years, when a data provider offers electronic data such as a computer program, the following method has been generally used. For example, a program is stored in a connectable server on the Internet and downloaded to a user (i.e., a data receiver) who connects with this. Besides, an electronic device possessed by a user as the data receiver is not limited to dedicated equipment having only a specific function (e.g., a copying function). As the market has been increasingly satisfied with hardware resources, an electronic device which has diverse functions complexly has been popular. Therefore, even after an electronic device has been newly introduced, if additional functions are incorporated therein, the electronic device can be given a multiple function and customized. This is serviceable to a user.

The above described background has recently encouraged the art of equipping an image forming apparatus such as a copying machine with an execution environment for a Web application program and installing an external application program in an image forming apparatus on the Internet. This prior art enables a user to access a Web page using a client terminal (i.e., a PC) linked to the Internet, and via this Web page, install the external application program in the image forming apparatus. This external application program is stored, for example, into a server, an IC card or the like which is linked to the Internet.

However, according to such an aspect of the prior art in which the external application program is stored in the server and installed from there in the image forming apparatus, a disadvantage arises in that a user tends to suffer damage, such as illegitimate read-out of data stored in the server and tapping of communication with the server. There is also a disadvantage in that the contents of the external application program may be maliciously altered through unjust access to the server and the application program altered without being noticed can be installed in the image forming apparatus.

In addition, if a third party with evil intent establishes a server and pretends to be a distributor of an application program, a user may install the application program from there unwittingly.

SUMMARY OF THE INVENTION

It is an object of the present invention to provide an art of providing or receiving data such as application program more securely.

A data providing system according to an aspect of the present invention, comprises: a storage section which stores an encoded file obtained by encoding a data file to be distributed with a predetermined common key and an encoded information file obtained by encoding an information data file including information on the common key with a private key different from the common key; and a file transfer section which transfers the encoded file and the encoded information file from the storage section to external electronic device.

A data receiving system according to another aspect of the present invention, comprises: an access section which accesses to a storage section storing an encoded file obtained by encoding a data file to be distributed with a predetermined common key and an encoded information file obtained by encoding an information data file including information on the common key with a private key different from the common key; and a file read-in section which reads in, using the access section, the encoded file and the encoded information file from the storage section.

According to still another aspect of the present invention, a computer-readable recording medium stores data providing program to be executed by a computer having a storage section which constitutes a data providing system. In addition, a computer-readable recording medium stores a data receiving program to be executed by a computer having an electronic device which constitutes a data receiving system.

These and other objects, features and advantages of the present invention will become more apparent upon reading of the following detailed description along with the accompanied drawings.

DETAILED DESCRIPTION OF THE PREFERRED EMBODIMENTS

Hereinafter, a preferred embodiment of the present invention will be described with reference to the attached drawings.

Figure 1:
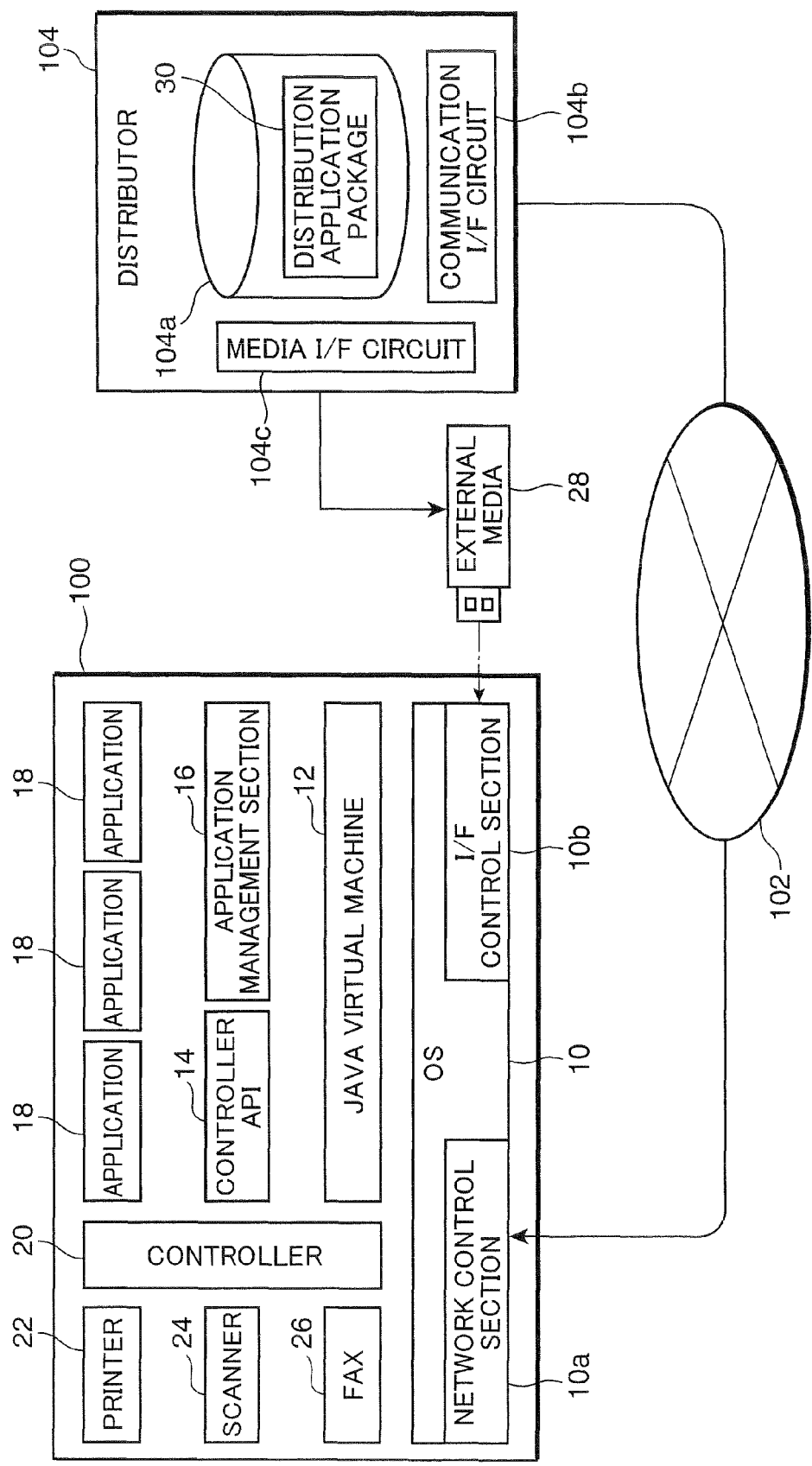
FIG. 1 is a block diagram, showing a configuration of a data providing system and a data receiving system according to an embodiment of the invention.

FIG. 1 is a schematic block diagram, showing a configuration of a data providing system and a data receiving system. In the data providing system, a user who receives electronic data possesses, for example, multiple-function peripheral equipment 100 (hereinafter, referred to as "MFP"). The user can use this MFP 100, for example, with linking to each type of communication line, such as the Internet 102, an LAN (or local area network) and a WAN (or wide area network). Besides, the data providing system can be built, for example, using a storage equipment (i.e., the storage section) with a storage area, such as a server 104 and an external media 28.

Furthermore, the server 104 is connected, for example, to the Internet 102 or another type of communication line. It includes a communication interface (or I/F) circuit 104b (i.e., the file transfer section) for transmitting and receiving data to and from a communication terminal such as the MFP 100, through the communication line.

Moreover, the server 104 includes, for example, a media I/F circuit 104c (i.e., the file transfer section) which corresponds to an interface circuit for giving access to the external media 28 applied to a standard such as a USB.

On the Internet 102, the server 104 is set up which is possessed by a person (a contents provider) who provides electronic data. Using this server 104, the provider can distribute, or provide, electronic data to a user. Via the Internet 102 from the server 104 corresponding to the origin of such distribution, the user can receive electronic data in the user's own MFP 100. First, individual configurations will be described.

The MFP (Multiple Function Peripheral) 100 is, for example, a digital complex machine which has an image forming apparatus as its basic formation. Specifically, in addition to a function as a copying machine, the MFP 100 has functions as a printer 22, a scanner 24 and a facsimile (or fax) 26. The printer 22 prints a copy of a draft, a document received by the fax 26 or the like. The scanner 24 reads a draft and generates its image data, and using this image data, copying or faxing is conducted.

In addition to these functions, the MFP 100 also has a function complexly as a network printer, a network scanner or a network client. A printer function, a scanner function or the like usable for a network is used through a network environment (e.g., an LAN and a WAN) different from the Internet 102.

In terms of the basic construction of the MFP 100, a well-known one can be applied. Specifically, the MFP 100 includes: first, a paper feed portion which feeds printing paper; and a scanner (i.e., an image read-out portion) which reads a draft image; an automatic draft forwarder (or ADF) which forwards a sheet of draft paper to the image reading position of the scanner; a print engine (i.e., an image formation portion) which transfers an image formed based on image data onto the paper; a post-processing apparatus which conducts a post-processing such as sorting, punching and stapling the image-transferred paper; and the like; and further, a controller 20 which controls such an operation.

Furthermore, the MFP 100 also includes an operation key for accepting an operation by a user, or a touch-type operation panel (both of which are not shown). On the operation panel are displayed a button area for a touch operation, and further, character information, a guidance image or the like.

Moreover, the MFP 100 has the function of a computer (i.e., a client) which executes a program, and for this reason, includes a hardware resource (not shown), such as a CPU (or central processing unit) and a memory device. Using this hardware resource, the MFP 100 can execute an OS (Operating System) 10 as basic software, as well as execute the data receiving program. The above described function of the printer 22, scanner 24, fax 26 or the like works over the OS 10 under the management of the controller 20.

The data receiving program is recorded in a recording medium which the MFP 100 as a computer can read it from, for example, a magnetic disk, a CD-ROM, a memory card or the like. Then, the data receiving program is read from this recording medium and stored in a storage section such as an HDD (or hard disk drive) and a memory which is provided in the MFP 100. Thereby, the data receiving program is installed. Or, the data receiving program is recorded in a recording medium of another computer (such as a server) and installed in the MFP 100 via the communication line such as a LAN and the Internet.

Furthermore, in the MFP 100, a Java (registered trademark) virtual machine 12 is built over the OS 10. This virtual machine 12 executes each kind of Java (registered trademark) application program 18 through a controller API 14. The application program 18 chosen when the MFP 100 operates is managed by an application management section 16.

The OS 10 includes a function element of a network control section 10*a* (i.e., the access section) or an interface (or I/F) control section 10*b* (i.e., the access section). The network control section 10*a* is connected, using a designated protocol, to the Internet 102, an in-plant or in-house network (e.g., an LAN and a WAN) or the like. By means of the network control section 10*a*, the MFP 100 has access to the server 104 via the Internet 102 or the like. The I/F control section 10*b* is, for example, a hardware interface which links with the external media 28 applied to a standard such as a USB. By means of the I/F control section 10*b*, the MFP 100 accesses to the external media 28. The external media 28 is, for example, a storage device (i.e., the storage section) such as a semiconductor memory.

The server 104 is a storage section provided with a database 104*a*, and in this database 104*a* is stored an application program package 30 for distribution. The distribution application program package 30 is an example of electronic data offered by a contents provider, and its specific contents are a Java (registered trademark) application program which can be added to the MFP 100. The server 104 sets, as a client, the MFP 100 or the like which accesses via the Internet 102, and thus, functions as a server-type computer which provides the distribution application program package 30 to this.

In addition, the distribution application program package 30 can be once stored in the external media 28, and in this state, transferred and provided from there to the MFP 100. In this case, a contents provider offers, for a user, the external media 28 having the distribution application program package 30 in store.

Next, the distribution application program package 30 will be described in detail.

Figure 2:
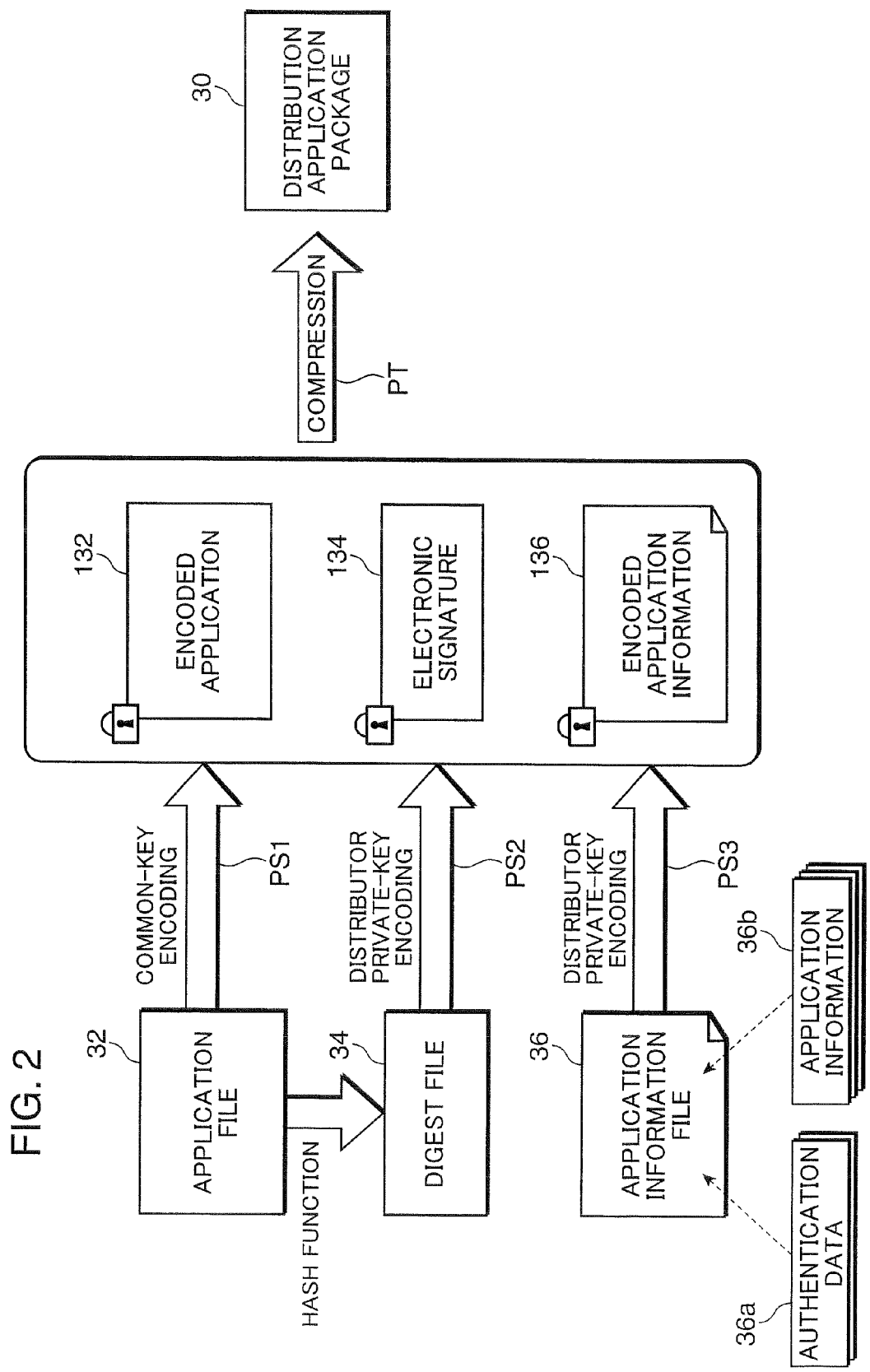
FIG. 2 is a flow diagram, showing the configuration of an application program package for distribution and a procedure for generating it.

FIG. 2 is a schematic flow diagram, showing the configuration of the application program package 30 for distribution and a procedure for generating it. The distribution application program package 30 is generated using three main separate files as its origin. Specifically, it originates from a file group of an application program file 32 (i.e., data file), a digest file 34 and an application program information file 36 (i.e., information data file). A provider gives a pre-processing such as encoding to these three files, and thereafter, executes a processing for compressing these pieces of data into a package. The three files which it is generated from will be described below.

First, the application program file 32 is installed and used in the MFP 100 of a user which is a distribution destination. As described earlier, it is an additional application program for adding some function to the MFP 100. This introduction of such an additional application program helps extend the function of the MFP 100 and improve its serviceability. The specific contents of the additional application program are not especially limited.

Next, the digest file 34 is data for verifying whether the application program file 32 has been falsified. The digest file 34 is generated, concretely, using a hash function from the text of the application program file 32.

The application program information file 36 is data which includes data 36a (i.e., the common key) for authentication and application program information 36*b*. The authentication data 36*a* is used for verifying whether or not a user who has received an application program is a regular person (a regular user) who is eligible to use this application program. Besides, the application program information file 36 includes information about the intrinsic properties or characteristics (i.e., attributes) or the like of the distribution application program package 30 itself or the application program packaged (included as data) in this. Such attributes are entered in a single file, for example, in an XML (or extensive markup language) format or another predetermined format. A specific example of the attributes will be described below.

(1) Application Program Name: the name (e.g., the name and trademark as a program product) of an application program determined by a provider. The "Application Program Name" is displayed as character information on its operation panel after the application program is installed in the MFP 100.

(2) Application Program File Name: the name of (i.e., for recognizing, using an OS or the like) an application program file. The Application Program File Name is given to the application program file inside of the machine when an additional application program is actually introduced in the MFP 100.

(3) Application Program Explanation: an explanation text of an application program function or the like. This explanation text is displayed as character information on the operation panel after an application program is installed in the MFP 100.

(4) Encoded Application Program File Name: the name of a file generated when the application program file 32 is encoded. The Encoded Application Program File Name is information for verifying an encoded application program 132 (i.e., the encoded file) packaged together in the distribution application program package 30. Such encoding will be further described later.

(5) Version: a version of an application program. Version information is information which is referred to when the application program is updated.

(6) Developer Name: the name of a company which developed an application program.

(7) Equipment-type List: a list of equipment in which an application program is operable. In terms of the MFP 100, it is equivalent to its specific equipment-type name, equipment-type number or the like.

(8) Usage Valid Period: a period of time when an application program is usable. For example, if the application program is permitted to be used with a time limit, it is equivalent to the usage valid period.

(9) Application Program Decoding Key: a key word for decoding the encoded application program 132. It is equivalent to the above described data 36a for authentication. Such a decoding key will be further described later.

This decoding key (i.e., the common key) (9) needs to be included as the authentication data 36a in the application program information file 36. However, the other attributes (1) to (8) are enumerated as an example. Hence, all the attributes (1) to (8) not necessarily have to be included in the application program information file 36, or attributes other than these may also be included.

Next, a description will be given of a packaging method for the distribution application program package 30. In FIG. 2, a processing flow for executing such packaging is indicated by outlined white arrows (i.e., reference characters and numerals PS1 to PS3 and PT).

First, a data provider as the distributor of an application program prepares the above described three files 32, 34, 36, and sequentially, executes a pre-processing. The pre-processing is executed by encoding each of the three files 32, 34, 36 in an appropriate system. This pre-processing for encoding the three files 32, 34, 36 will be described below.

Pre-processing PS1: in this step, the application program file 32 is encoded in a common-key system. A common key used here is created, for example, from a licensed key (such as a character string) designated by the data provider. Preferably, the licensed-key character string itself can be used as the common key. In this embodiment, an encoded one is referred to as the encoded application program 132. In FIG. 2, to the block diagram which represents the encoded application program 132, a mark which expresses a "key" is affixed which indicates that data is encoded.

Pre-processing PS2: in this step, the digest file 34 is encoded in a public-key system. For this encoding, a private key is used which is non-publicly held by the distribution-origin data provider. In this embodiment, the digest file 34 encoded using the private key is referred to as an electronic signature (or the encoded digest) 134.

Pre-processing PS3: in this step, the application program information file 36 is encoded in a public-key system. In the same way as the pre-processing PS2, for this encoding, a private key is used which is non-publicly held by the distribution-origin data provider. In this embodiment, the application program information file 36 encoded using the private key is referred to as encoded application program information 136 (or the encoded information file).

Data Compression PT: in this step, the ones encoded in the pre-processing PS1 to PS3 are collected and compressed into a data file. This generated one corresponds to the distribution application program package 30. In the distribution application program package 30, therefore, the three files 32, 34, 36 as its generation origin are packaged together. Besides, such data compression makes it possible to simplify a transmission on the Internet 102 or reduce the capacity of the external media 28.

On the other hand, a user decodes the three encoded files taken out from the distribution application program package 30, using the following method.

(1) The encoded application program 132 can be decoded using a common key. As described above, the common key is equivalent to a licensed key designated by the data provider as the distributor.

(2) The electronic signature 134 can be decoded using a public key which is provided with the private key in pair of the distributor. This public key is distributed to the user from the data provider, separately from the distribution application program package 30. The public key is distributed, for example, through a transmission by mail or facsimile, a notification by telephone, or the like.

(3) The encoded application program information 136 can be decoded, in the same way, using a public key to make a pair of the private key of the distributor. This public key is also distributed to the user from the data provider, separately from the distribution application program package 30.

In this embodiment, the data provider who distributes the application program executes the above described pre-processing PS1 to PS3, so that the three files 32, 34, 36 can be encoded. This presents measures against wire tapping when data is provided. Specifically, even if a third person (i.e., a person who has evil intent) other than a regular user acquires the distribution application program package 30 by unjust means, the third person who does not have the common key and the public key cannot decode this. As a result, the third person cannot use the application program, thereby certainly preventing the third person from illegitimately using. Besides, the third person can be hindered from reading and taking the contents (or source) of the application program file 32. This makes it possible to prevent the third person from using it for an evil purpose.

The details have been given of the distribution application program package 30 provided by the data providing system according to this embodiment. On the other hand, a user who receives the distribution application program package 30 using the MFP 100 can actually use an application program along the following procedure.

Figure 3:
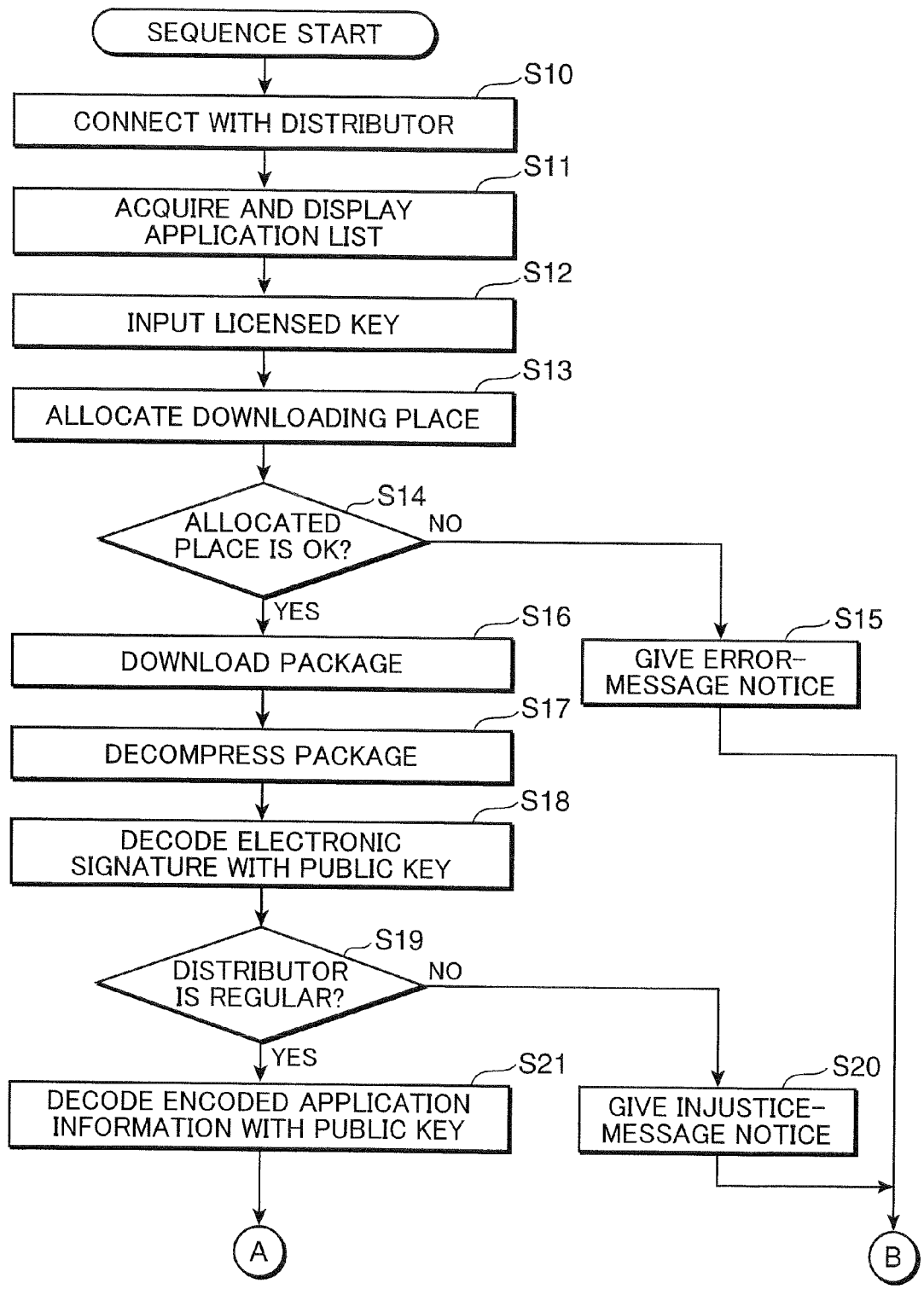
FIG. 3 is a flow chart showing a first half part of an installation processing sequence for an application program.
Figure 4:
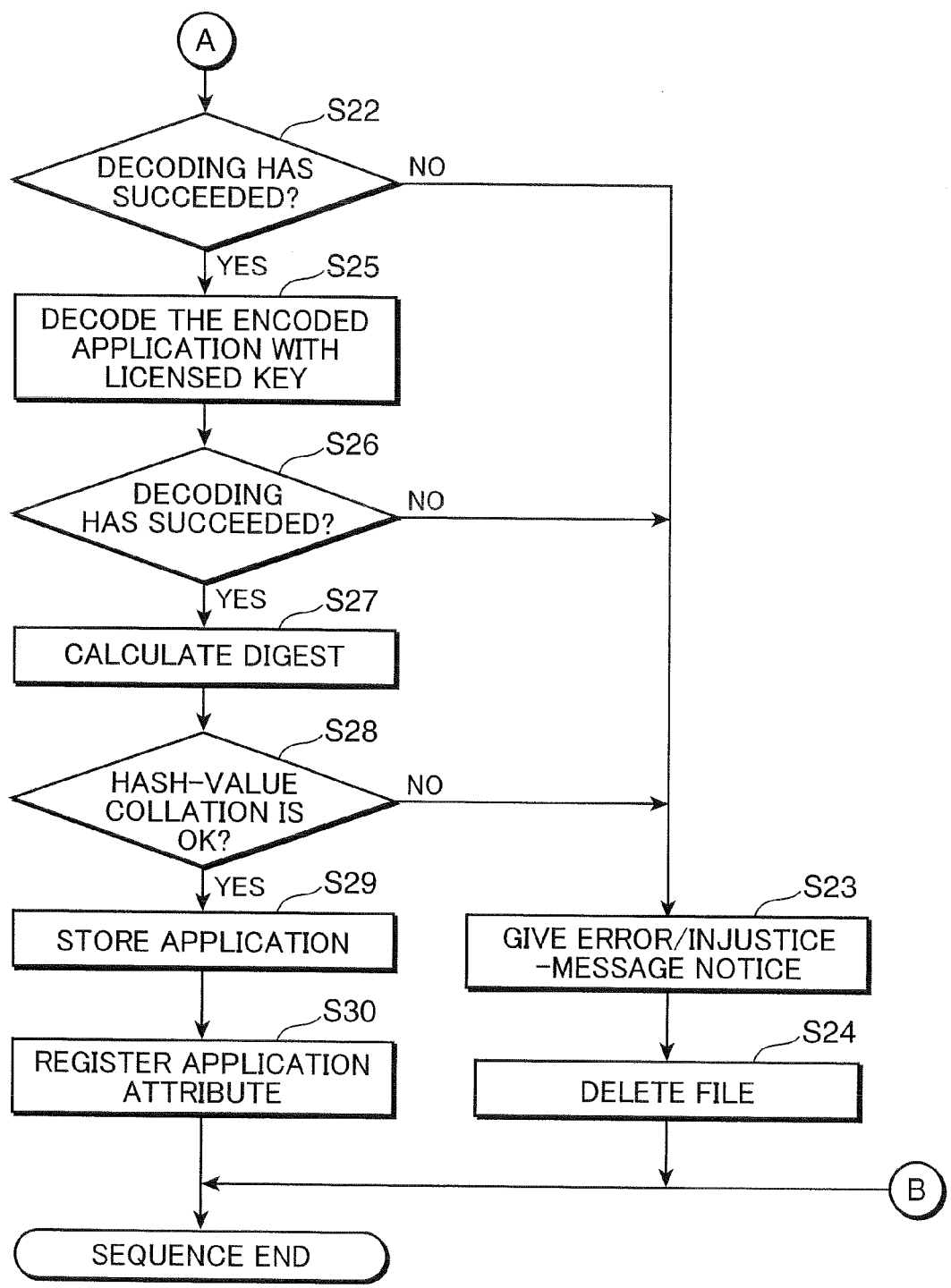
FIG. 4 is a flow chart showing a second half part of the installation processing sequence.

FIG. 3 and FIG. 4 is a flow chart, showing an example of an installation processing sequence (i.e., the data receiving program) for an application program. Hereinafter, the sequence example will be described along its procedure. The CPU of the MFP 100 executes the data receiving program, so that the MFP 100 can execute the operation shown in FIG. 3 and FIG. 4. In addition, the CPU of the MFP 100 executes the data receiving program, so that the MFP 100 can function as the file read-in section, information-file generation section, key extraction section, file decoding section, digest generation section, hash-value calculation section and authentication section.

Step S10: On the basis of an operation by a user, the MFP 100 is connected to an origin (such as the server 104 and the external media 28) which distributes an application program to be installed from now, so that the MFP 100 can transmit and receive data to and from it. As described earlier, it is connected through the Internet 102 to the server 104. Besides, its connection to the external media 28 is made through a hardware interface applied to its standard.

Step S11: Next, the MFP 100 acquires information on the application program at the distribution origin which it has connected with. Then, the MFP 100 displays its list on a screen (i.e., an operation panel).

Step S12: Based on an operation input by the user, the MFP 100 accepts designation of the application program to be installed from now in the MFP 100. At the same time, it accepts (registration of) a licensed key of the application program. The inputted licensed key is stored, for example, in a memory (i.e., an RAM) held by the MFP 100.

Step S13: Next, in the MFP 100, a downloading place (such as a URL) is allocated in accordance with the application program designated in the preceding step S12.

Step S14: The MFP 100 accesses to the allocated place and verifies whether or not the distribution application program package 30 lies there.

Step S15: in the former step S13, if the place allocated by the user is not correct, in other words, if the distribution application program package 30 does not lie there (i.e., the step S14=No), the MFP 100 displays an error message on the operation panel that the application program does not lie. Then, it notifies the user of the fact. In this case, the MFP 100 terminates this sequence for the present (i.e., the connection character B of FIG. 3→the connection character B of FIG. 4).

Step S16: On the other hand, in the former step S13, if the place allocated by the user is correct (i.e., the step S14=Yes), the MFP 100 downloads the distribution application program package 30 for the application program from the allocated place.

Step S17: The MFP 100 decompresses the downloaded distribution application program package 30. Upon completing the decompression, it takes out the three encoded files packaged together there, or the above described encoded application program 132, electronic signature 134 and encoded application program information 136.

Step S18: Next, the MFP 100 decodes the electronic signature 134, using the public key inputted (or registered) beforehand. Thereby, the above described digest file 34 is taken out. As described earlier, the public key is provided with the private key in pair used for encoding the electronic signature 134 at the distribution origin.

Step S19: On the basis of whether or not the digest file 34 has been decoded using the public key, the MFP 100 decides whether the distributor (i.e., the server 104 or the external media 28) of the application program is regular or not. For example, even if a third person sets up another server and pretends to be the distributor, the decoding results in failure because the contents of the digest file 34 are not identical with the contents of the distributor. Thereby, the fact that this third person is not the regular distributor can be found out.

Step S20: If the decision is made that the distributor is not regular (i.e., the step S19=No), the MFP 100 notifies the user of a message that the application program file is false. Simultaneously, it deletes the downloaded file. In this case, the MFP 100 terminates this sequence here (i.e., the connection character B of FIG. 3→the connection character B of FIG. 4).

Step S21: On the other hand, in the former step S13, if the verification is obtained that the distributor is regular (i.e., the step S19=Yes), the MFP 100 decodes the encoded application program information 136, using the public key inputted (or registered) in advance. The sequence after this is shown in FIG. 4 (i.e., the connection character A of FIG. 3→the connection character A of FIG. 4).

Step S22: The MFP 100 verifies whether or not the encoded application program information 136 has been successfully decoded. At this time, for example, if the public key held by the user differs, the MFP 100 fails to decode it. If the decoding ends in failure (i.e., No), then sequentially, the MFP 100 goes ahead to a step S23.

Step S23: The MFP 100 displays an error message on the operation panel and notifies the user that it has failed in the decoding.

Step S24: Next, the MFP 100 deletes the downloaded file, and here, terminates this sequence.

On the other hand, in the former step S21, if the encoded application program information 136 has been successfully decoded (i.e., the step S22=Yes), that means the above described application program information file 36 has been correctly retrieved. In this case, the MFP 100 goes ahead to a step S25.

Step S25: The application program information file 36 includes the licensed key (i.e., the data 36a for authentication (or the common key)). Therefore, using this, the MFP decodes the encoded application program 132.

Step S26: The MFP 100 verifies whether or not the encoded application program 132 has been successfully decoded. If the licensed key is not identical for some reason (e.g., its valid period has expired and it has not been updated), the MFP 100 fails to decode it. If the decoding ends in failure (i.e., No), then sequentially, the MFP 100 goes ahead to the step S23.

Step S23: The MFP 100 displays an error message on the operation panel and notifies the user that it has failed in the decoding.

Step S24: Next, the MFP 100 deletes the downloaded file, and here, terminates this sequence.

On the other hand, in the former step S25, if the encoded application program 132 has been successfully decoded (i.e., the step S26=Yes), that means the application program file 32 to be installed has been correctly retrieved. In this case, the MFP 100 moves to a step S27.

Step S27: The MFP 100 calculates the digest (or. i.e., hash value) of the application program file 32.

Step S28: Next, the MFP 100 collates this calculation result with the hash value of the digest file 34 taken out at the former step S18. Thereby, it authenticates the downloaded application program file 32. As a result of this collation, if those hash values do not coincide (i.e., No), the MFP 100 moves to the step S23.

Step S23: The MFP 100 displays an illegitimacy message on the operation panel and notifies the user that the downloaded application program file 32 is unjust.

Step S24: In this case, the MFP 100 deletes the downloaded file, and here, terminates this sequence.

On the other hand, as a result of the collation in the former step S28, if the hash values coincide each other (i.e., Yes), the verification can be obtained that the downloaded application program file 32 is regular. In this case, the MFP 100 goes ahead to a step S29.

Step S29: The MFP 100 stores the application program file 32. The storage place is, for example, a fixed storage unit such as a memory and a hard disk. Thereby, the distributed application program file 32 becomes usable (i.e., one of the application programs 18 shown in FIG. 1) in the MFP 100.

Step S30: In addition, the MFP 100 reads in data inside of the application program information file 36 and registers this data as an application program attribute. In addition to the above described one, such attributes to be registered include, for example, the application program ID or usage valid period. Upon completing the registration, the MFP 100 terminates this sequence.

The above described sequence example has the following advantages.

First, on the side of a user (i.e., the MFP 100), a processing (i.e., the steps S18, S21) is executed for decoding a file encoded using a private key possessed only by a regular distributor, using a public key of the distributor which is provided with the private key in pair. Therefore, the verification can be obtained that the distributor is authentic. This processing is effective as a measure against a so-called "impersonation".

Furthermore, in terms of the encoded application program 132, a processing (i.e., the step S25) is executed for decoding it using a common key created from a licensed key for an application program. Therefore, only a user who is given a valid license from a distributor can install the application program. This processing is effective as a so-called "license" measure.

The electronic signature 134 is obtained by encoding a digest of the application program file 32 packaged together in the distribution application program package 30. Therefore, the proof that the packaged-together application program file 32 is authentic can be given, using the digest obtained by decoding. This processing is effective as a measure against a so-called "falsification".

The present invention is not restricted to the above described embodiment, and thus, it can be accompanied and implemented with each kind of variation or addition.

For example, in the embodiment, the encoded application program 132, the electronic signature 134 and the encoded application program information 136 are united to form a single compressed file as the distribution application program package 30. Then, this file is distributed to a user. However, an aspect may also be adopted in which in such a manner that those are interrelated, they are each distributed individually or with divided into a plurality.

In the embodiment, the digest file 34 and the application program information file 36 are separate. However, for example, the digest of the application program may also be stored in the application program information file 36. Even in this case, the encoded application program information 136 is decoded using a public key. Thereby, in accordance with whether or not the encoded application program information 136 has been successfully decoded, a verification can be executed whether or not its acquisition route or distribution origin is regular.

Moreover, in the storage section such as the server 104 as a distributor and the external media 28, if a list file corresponding to the list of application programs stored there is stored, then a verification can be executed whether or not an application program is authentic. In such a list file is stored, for example, the file name of an authentic application program stored in the storage section. For example, if an application program which is not entered on the list of the server 104 or the external media 28 is written, the fact that this application program is not authentic can be easily verified.

In this case, even if a third party with evil intent stores a false application program in a storage unit such as the server 104 and the external media 28, then the MFP 100 decides that this application program which is not entered on the list of application programs stored in the storage unit is not an authentic application program, This helps lower the possibility that such a false application program may be downloaded and executed in the MFP 100.

At the same time, the list of application programs already installed can also be put in a predetermined place (i.e., a storage unit) of the MFP 100.

In the embodiment, the case is described where an additional application program is newly installed. However, the above described sequence can also be applied when an application program already installed in the MFP 100 is updated. Incidentally, when such an application program is updated, the "Version" given earlier as an example may be verified at the time of installation.

Furthermore, in the embodiment, an application program used by the electronic device such as the MFP 100 is illustrated as a distribution object. However, as the distribution object, any electronic data may be used, so long as it can be encoded. Besides, the electronic device given electronic data is not limited to the MFP 100, and thus, a general-purpose personal computer, a portable information terminal or the like can also be adopted.

A data providing system according to an aspect of the present invention, comprising: a storage section which stores an encoded file obtained by encoding a data file to be distributed with a predetermined common key and an encoded information file obtained by encoding an information data file including information on the common key with a private key different from the common key; and a file transfer section which transfers the encoded file and the encoded information file from the storage section to external electronic device.

According to this configuration, a data file to be distributed is encoded using a common key and stored as an encoded file in the storage section. The common key used for decoding this encoded file is included in another information data file. This information data file is encoded using a private key and stored as an encoded information file in the storage section. Then, these encoded file and encoded information file are transferred from the storage section to external electronic device. Thereby, electronic data can be provided.

For example, when a provider of electronic data sets up a storage section such as a server and stores the electronic data in it, as described above, if the electronic data is encoded, that makes it possible to substantially escape damage from tapping. Even if the electronic data is wiretapped, the encoded data is difficult to decode, so that the wiretapper cannot use it.

Furthermore, it is preferable that the storage section further store an encoded digest obtained by encoding a digest file including a hash value intrinsic to the data file to be distributed with a predetermined private key; and the file transfer section transfer the encoded digest as well as the encoded file and the encoded information file to the electronic device.

According to this configuration, an encoded digest as well as the above described encoded file and encoded information file are further stored in the storage section. The encoded digest is obtained by encoding a digest file including a hash value intrinsic to the data file to be distributed with a predetermined private key. In this case, together with the encoded file and the encoded information file, the encoded digest is transferred to the electronic device.

The digest file is used for proving that electronic data stored in the storage section is authentic, in other words, a data file to be distributed is not falsified. A person who receives the electronic data decodes the encoded digest using a public key and takes out the hash value from the digest file. Separately, the person calculates the hash value from the decoded data file and collates these. Thereby, whether or not the data file has been dishonestly altered can be verified.

Moreover, preferably, the file transfer section should transfer at least the encoded file and the encoded information file in such a manner that both are interrelated.

The common key included in the encoded information file is necessary for decoding the encoded file corresponding to this. Hence, these are interrelated when transferred, so that the encoded file can be easily decoded.

Furthermore, a data receiving system according to an aspect of the present invention, comprising: an access section which accesses to a storage section storing an encoded file obtained by encoding a data file to be distributed with a predetermined common key and an encoded information file obtained by encoding an information data file including information on the common key with a private key different from the common key; and a file read-in section which reads in, using the access section, the encoded file and the encoded information file from the storage section.

This data receiving system is a form for the use of a person who receives electronic data. The data receiving system has a function which corresponds to the data providing system. Specifically, in the case where an encoded file obtained by encoding a data file to be distributed using a predetermined common key as well as an encoded information file obtained by encoding an information data file including information on the common key using a different private key is stored in the storage section, the data receiving system has a function of accessing the storage section. Then, the data receiving system has a function of reading the encoded file and the encoded information file from the storage section by accessing the storage section.

In addition, it is preferable that the data receiving system comprise: an information-file generation section which generates the information data file by decoding the encoded information file read in by the file read-in section, using a public key to make a pair of the private key; a key extraction section which extracts the common key from the information included in the information data file generated by the information-file generation section; and a file decoding section which decodes the encoded file read in by the file read-in section, using the common key extracted by the key extraction section.

According to this configuration, a receiver who regularly receives provision (or transfer) of electronic data decodes the encoded file with the common key, using the data receiving system, so that the receiver can take out the data file as the target. This common key is included with kept encoded in the encoded information file. Hence, the encoded information file is decoded using the public key, so that the common key can be retrieved from the encoded information file. The public key is form a pair with the private key secretly held by the provider of the electronic data. Therefore, a person other than the one (i.e., the regular receiver) who is given this cannot take out the common key, thus finally, making it impossible to acquire the data file.

In this way, in the above described data providing system, the data file can be distributed only to the person (i.e., the regular receiver) who is given the public key to make a pair of the private key possessed by the provider of the electronic data.

Furthermore, preferably: the storage section should further have in store an encoded digest obtained by encoding a digest file including a hash value intrinsic to the data file to be distributed with a predetermined private key; the file read-in section should read in, using the access section, the encoded digest as well as the encoded file and the encoded information file from the storage section; and a digest generation section should be further provided which generates the digest file by decoding the encoded digest using a public key to make a pair of the private key used for obtaining the encoded digest read in by the file read-in section.

According to this configuration, in the case where an encoded digest is stored in the storage section of the data providing system, the data receiving system reads the encoded digest as well as the encoded file and encoded information file from the storage section. Besides, the data receiving system decodes the encoded digest using the public key to make a pair of the private key used for obtaining the encoded digest, so that the digest file can be generated.

Moreover, it is preferable that: the storage section further have in store an encoded digest obtained by encoding a digest file including a hash value intrinsic to the data file to be distributed with a predetermined private key; and the file read-in section read in, using the access section, the encoded digest as well as the encoded file and the encoded information file from the storage section; and the data receiving system further comprise: a digest generation section which generates the digest file by decoding the encoded digest using a public key to make a pair of the private key used for obtaining the encoded digest read in by the file read-in section; a hash-value calculation section which calculates a hash value of the file obtained by decoding the encoded file using the file decoding section; and an authentication section which authenticates the file obtained by decoding the encoded file, based on a comparison result between the hash value acquired from a digest generated by the digest generation section and the hash value calculated by the hash-value calculation section.

According to this configuration, the encoded digest is decoded using the public key, and the hash value is retrieved from the digest file. Separately, the hash value is calculated from the decoded data file, and these are collated so that whether or not the data file has been dishonestly altered can be verified.

In addition, preferably: the storage section should have in store a list file including the file name of an authentic program stored in this storage section; and if the file name of the encoded file and the encoded information file is not stored in the list file stored in the storage section when the file read-in section reads in the encoded file and the encoded information file from the storage section, then the file read-in section should stop reading in these encoded file and encoded information file.

According to this configuration, even if a third party with evil intent stores a false program file in the storage section, then the decision is made that this file which is not entered on the list of files stored in the storage section is not an authentic file. Hence, the file is not supposed to be read in, so that the possibility becomes lower that such a false program file may be downloaded and executed.

Furthermore, it is preferable that the file read-in section read in, from the storage section, at least the encoded file and the encoded information file in such a manner that both are interrelated.

The common key included in this encoded information file is necessary for decoding the encoded file corresponding to this. Hence, these are read with interrelated, so that the encoded file can be easily decoded.

Moreover, a data providing method according to an aspect of the present invention, comprising: a step of generating an encoded file obtained by encoding a data file to be distributed with a predetermined common key; a step of generating an encoded information file obtained by encoding an information data file including information on the common key with a private key different from the common key; a step of storing the encoded file and the encoded information file in a predetermined storage section; and a step of transferring the encoded file and the encoded information file from the storage section to external electronic device.

In addition, preferably, the data providing method should further comprise: a step of storing, in the storage section, an encoded digest obtained by encoding a digest file including a hash value intrinsic to the data file to be distributed with a predetermined private key; and a step of transferring the encoded digest as well as the encoded file and the encoded information file to the electronic device.

Furthermore, it is preferable that in the step of transferring each file to the electronic device, at least the encoded file and the encoded information file be transferring in such a manner that both are interrelated.

Moreover, a computer-readable recording medium storing data providing program according to an aspect of the present invention, which allows a computer including a storage section having a predetermined storage area to execute: a procedure for generating an encoded file obtained by encoding a data file to be distributed with a predetermined common key; a procedure for generating an encoded information file obtained by encoding an information data file including information on the common key with a private key different from the common key; a procedure for storing the encoded file and the encoded information file in the storage area; and a procedure for transferring the encoded file and the encoded information file from the storage section to external electronic device.

In addition, the computer including the storage section is allowed to further execute: a procedure for storing, in the storage area, an encoded digest obtained by encoding a digest file including a hash value intrinsic to the data file to be distributed with a predetermined private key; and a procedure for transferring the encoded digest as well as the encoded file and the encoded information file to the electronic device.

Furthermore, a computer-readable recording medium storing a data receiving program according to an aspect of the present invention, which allows a computer to execute: a procedure for giving access to a storage section storing an encoded file obtained by encoding a data file to be distributed with a predetermined common key and an encoded information file obtained by encoding an information data file including information on the common key with a private key different from the common key; and a file procedure for giving access to the storage section and reading in the encoded file and the encoded information file from the storage section.

Moreover, the computer is allowed to further execute: a procedure for generating the information data file by decoding the encoded information file transferred from the storage section, using a public key to make a pair of the private key; and a procedure for extracting the common key from the information included in the information data file so that the encoded file transferred from the storage section is decoded.

In addition, the computer is allowed to further execute: a procedure for giving access to the storage section which further stores an encoded digest obtained by encoding a digest file including a hash value intrinsic to the data file to be distributed with a predetermined private key, as well as the encoded file and the encoded information file; and a procedure for reading in, from the storage section, the encoded digest as well as the encoded file and the encoded information file; and a procedure for generating the digest file by decoding the encoded digest using a public key to make a pair of the private key used for obtaining the encoded digest.

The above described data providing method according to an aspect of the present invention is realized along with an operation of the above described data providing system. Furthermore, the above described data providing program stored in the computer-readable recording medium is executed by the computer including the storage section which forms a part of the data providing system. Moreover, the above described data receiving program stored in the computer-readable recording medium is executed by the computer which forms a part of the data receiving system.

As described so far, according to the configuration according to an aspect of the present invention, an extremely effective measure can be presented against a wiretap or an unjust alteration to a data file to be distributed. Therefore, a person who provides a data file can prevent a person other than a regular receiver from stealing this data file. Besides, a person who receives the data file can always be guaranteed that this data file given by the provider is authentic.

On the other hand, a person who is offered a data file can prevent a third person from stealing this data file at the time of its reception. Besides, the receiver is guaranteed that this received data file is authentic, thus helping use the received data file without anxiety.

This application is based on Japanese Patent Application No. 2007-007282, filed in Japan Patent Office on Jan. 16, 2007, the contents of which are hereby incorporated by reference.

Although the present invention has been fully described by way of example with reference to the accompanied drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A data providing system, comprising:
a storage section which stores an encoded file obtained by encoding a data file to be distributed with a predetermined common key, an encoded information file obtained by encoding an information data file including information on the common key with a private key different from the common key and an encoded digest obtained by encoding a digest file including a hash value intrinsic to the data file with a predetermined private key; and
a file transfer section which transfers the encoded file, the encoded information file and the encoded digest from the storage section to external electronic device.

2. The data providing system according to claim 1, wherein the file transfer section transfers at least the encoded file and the encoded information file in such a manner that both are interrelated.

3. A data receiving system, comprising:
- an access section which accesses to a storage section storing an encoded file obtained by encoding a data file to be distributed with a predetermined common key, an encoded information file obtained by encoding an information data file including information on the common key with a private key different from the common key and an encoded digest obtained by encoding a digest file including a hash value intrinsic to the data file with a predetermined private key;
- a file read-in section which reads in, using the access section, the encoded file, the encoded information file and the encoded digest from the storage section; and
- a digest generation section that generates the digest file by decoding the encoded digest using a public key to make a pair of the private key used for obtaining the encoded digest.

4. The data receiving system according to claim 3, further comprising:
- an information-file generation section which generates the information data file by decoding the encoded information file read in by the file read-in section, using a public key to make a pair of the private key;
- a key extraction section which extracts the common key from the information included in the information data file generated by the information-file generation section; and
- a file decoding section which decodes the encoded file read in by the file read-in section, using the common key extracted by the key extraction section.

5. The data receiving system according to claim 4,
further comprising:
- a hash-value calculation section which calculates a hash value of the file obtained by decoding the encoded file using the file decoding section; and
- an authentication section which authenticates the file obtained by decoding the encoded file, based on a comparison result between the hash value acquired from a digest generated by the digest generation section and the hash value calculated by the hash-value calculation section.

6. The data receiving system according to claim 3, wherein:
the storage section stores a list file including the file name of an authentic program stored in this storage section; and
if the file name of the encoded file and the encoded information file is not stored in the list file stored in the storage section when the file read-in section reads in the encoded file and the encoded information file from the storage section, then the file read-in section stops reading in these encoded file and encoded information file.

7. The data receiving system according to claim 3, wherein the file read-in section reads in, from the storage section, at least the encoded file and the encoded information file in such a manner that both are interrelated.

8. A computer-readable recording medium storing data providing program which allows a computer including a storage section having a predetermined storage area to execute:
- a procedure for generating an encoded file obtained by encoding a data file to be distributed with a predetermined common key;
- a procedure for generating an encoded information file obtained by encoding an information data file including information on the common key with a private key different from the common key;
- a procedure for storing the encoded file and the encoded information file in the storage area;
- a procedure for storing, in the storage area, an encoded digest obtained by encoding a digest file including a hash value intrinsic to the data file with a predetermined private key; and
- a procedure for transferring the encoded file, the encoded information file, and the encoded digest from the storage section to external electronic device.

9. A computer-readable recording medium storing a data receiving program which allows a computer to execute:
- a procedure for giving access to a storage section storing an encoded file obtained by encoding a data file to be distributed with a predetermined common key, an encoded information file obtained by encoding an information data file including information on the common key with a private key different from the common key and an encoded digest obtained by encoding a digest file including a hash value intrinsic to the data file with a predetermined private key;
- a file procedure for giving access to the storage section and reading in the encoded file, the encoded information file and the encoded digest from the storage section; and
- a procedure for generating the digest file by decoding the encoded digest using a public key to make a pair of the private key used for obtaining the encoded digest.

10. The computer-readable recording medium storing the data receiving program according to claim 9, which allows the computer to further execute:
- a procedure for generating the information data file by decoding the encoded information file transferred from the storage section, using a public key to make a pair of the private key; and
- a procedure for extracting the common key from the information included in the information data file so that the encoded file transferred from the storage section is decoded.

* * * * *